United States Patent
Hara et al.

(10) Patent No.: US 11,572,507 B2
(45) Date of Patent: Feb. 7, 2023

(54) LIQUID-CRYSTAL POLYESTER RESIN COMPOSITION

(71) Applicant: Sumitomo Chemical Company, Limited, Tokyo (JP)

(72) Inventors: Tomoyuki Hara, Tokyo (JP); Yasuyuki Fujita, Tokyo (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 735 days.

(21) Appl. No.: 16/473,823

(22) PCT Filed: Dec. 26, 2017

(86) PCT No.: PCT/JP2017/046810
§ 371 (c)(1),
(2) Date: Jun. 26, 2019

(87) PCT Pub. No.: WO2018/124145
PCT Pub. Date: Jul. 5, 2018

(65) Prior Publication Data
US 2021/0071082 A1    Mar. 11, 2021

(30) Foreign Application Priority Data

Dec. 28, 2016 (JP) ............... JP2016-256462

(51) Int. Cl.
*C09K 19/38* (2006.01)
*C08K 3/34* (2006.01)
(Continued)

(52) U.S. Cl.
CPC .......... *C09K 19/3809* (2013.01); *C08K 3/346* (2013.01); *C08K 7/14* (2013.01);
(Continued)

(58) Field of Classification Search
CPC .......... C09K 19/3809; C09K 2019/521; C08K 3/34; C08K 3/346; C08K 3/013;
(Continued)

(56) References Cited

U.S. PATENT DOCUMENTS 4,124,561 A    11/1978  Phipps, Jr. et al.
5,428,100 A    6/1995   Asai et al.
(Continued)

FOREIGN PATENT DOCUMENTS

CN    1377937 A       11/2002
JP    S53094529 A     8/1978
(Continued)

OTHER PUBLICATIONS

International Search Report dated Mar. 13, 2018 in International Application No. PCT/JP2017/046810.
(Continued)

*Primary Examiner* — Jane L Stanley
(74) *Attorney, Agent, or Firm* — Panitch Schwarze Belisario & Nadel LLP

(57) ABSTRACT

A liquid crystal polyester resin composition includes: (A) liquid crystal polyester; (B) talc; and (C) mica, in which the total amount ((B)+(C)) of the (B) talc and the (C) mica is in a range of 5 parts by mass to 100 parts by mass with respect to 100 parts by mass of the (A) liquid crystal polyester, and a mass ratio ((B)/(C)) of a mass of the (B) talc to a mass of the (C) mica is in a range of 9/1 to 1/9.

12 Claims, 2 Drawing Sheets

(51) Int. Cl.
 *C08K 7/14* (2006.01)
 *C09K 19/52* (2006.01)
(52) U.S. Cl.
 CPC .. *C08K 2201/004* (2013.01); *C08K 2201/005* (2013.01); *C09K 2019/521* (2013.01)
(58) Field of Classification Search
 CPC ...... C08K 7/14; C08K 7/02; C08K 2201/004; C08K 2201/005; C08K 13/04
 See application file for complete search history.

(56) References Cited

U.S. PATENT DOCUMENTS

| | | | |
|---|---|---|---|
| 7,405,253 B2* | 7/2008 | Kurasawa | C08K 7/10 524/451 |
| 9,994,771 B2* | 6/2018 | Hegi | C09K 19/3809 |
| 2003/0001139 A1 | 1/2003 | Nagano et al. | |
| 2003/0168634 A1 | 9/2003 | Yamauchi et al. | |
| 2005/0182166 A1 | 8/2005 | Kurasawa | |
| 2009/0253847 A1 | 10/2009 | Komatsu et al. | |
| 2010/0163796 A1* | 7/2010 | Fukuhara | C09K 19/3809 252/299.61 |
| 2011/0089371 A1 | 4/2011 | Murouchi et al. | |
| 2012/0104315 A1* | 5/2012 | Fukuhara | C09K 19/54 252/299.5 |
| 2013/0022828 A1 | 1/2013 | Matsubara et al. | |
| 2013/0026413 A1 | 1/2013 | Uchida et al. | |
| 2013/0082206 A1 | 4/2013 | Fukuhara et al. | |
| 2015/0038631 A1 | 2/2015 | Hamaguchi et al. | |
| 2015/0073068 A1 | 3/2015 | Komatsu et al. | |
| 2015/0353827 A1* | 12/2015 | Hegi | C09K 19/54 252/299.01 |
| 2018/0355150 A1* | 12/2018 | Kim | C08J 3/201 |
| 2018/0362848 A1* | 12/2018 | Kim | C08G 63/605 |
| 2019/0055398 A1* | 2/2019 | Tojo | C08L 63/04 |
| 2019/0233619 A1* | 8/2019 | Kato | C08K 9/04 |
| 2019/0309204 A1* | 10/2019 | Takagi | C08K 3/04 |
| 2020/0071516 A1* | 3/2020 | Tojo | C08G 63/183 |
| 2020/0115546 A1* | 4/2020 | Hara | C08K 3/346 |
| 2020/0216642 A1* | 7/2020 | Sugiyama | C08K 7/14 |
| 2020/0347224 A1* | 11/2020 | Hara | C08G 63/685 |
| 2020/0399465 A1* | 12/2020 | Hara | C08K 7/14 |
| 2022/0204852 A1* | 6/2022 | Ha | C08K 3/30 |

FOREIGN PATENT DOCUMENTS

| | | |
|---|---|---|
| JP | H04033946 A | 2/1992 |
| JP | H04076049 A | 3/1992 |
| JP | H06207083 A | 7/1994 |
| JP | H10265215 A | 10/1998 |
| JP | 2003246923 A | 9/2003 |
| JP | 2004351860 A | 12/2004 |
| JP | 2005206802 A | 8/2005 |
| JP | 2008138181 A | 6/2008 |
| JP | 2008176029 A | 7/2008 |
| JP | 2009242453 A | 10/2009 |
| JP | 2009263640 A | 11/2009 |
| JP | 2011213951 A | 10/2011 |
| JP | 2012206296 A | 10/2012 |
| JP | 2012214652 A | 11/2012 |
| JP | 2013028678 A | 2/2013 |
| JP | 2013072070 A | 4/2013 |
| JP | 2013147628 A | 8/2013 |
| JP | 2013194165 A | 9/2013 |
| JP | 2014237740 A | 12/2014 |
| JP | 2015147881 A | 8/2015 |
| WO | 2012117475 A1 | 9/2012 |
| WO | 2013128887 A1 | 9/2013 |

OTHER PUBLICATIONS

Office Action dated Feb. 26, 2021 in TW Application No. 106145887.
Office Action dated May 19, 2020 in JP Application No. 2016256462 (with English Machine Translation).
Notice of Reasons for Revocation dated Aug. 4, 2021 in JP Application No. 2016256462 (with English Machine Translation).
Office Action dated Jul. 18, 2021 in KR Application No. 1020197018353 (with English Machine Translation).
Office Action dated Nov. 23, 2020 in CN Application No. 201780080875.9.
Decision of Opposition issued Feb. 1, 2022 in JP Application No. 2016256462 (with English Machine Translation).
Office Action dated Feb. 25, 2022 in KR Application No. 1020217043045 (with English Machine Translation).
Office Action dated Aug. 29, 2022 in CN Application No. 202110813552.4 (with English Machine Translation).

* cited by examiner

LIQUID-CRYSTAL POLYESTER RESIN COMPOSITION

CROSS-REFERENCE TO RELATED APPLICATION

This application is a Section 371 of International Application No PCT/JP2017/046810, filed Dec. 26, 2017, which was published in the Japanese language on Jul. 5, 2018 under International Publication No. WO 2018/124145 A1, which claims priority under 35 U.S.C. § 119(b) to Japanese Application No. 2016-256462, filed Dec. 28, 2016, the disclosures of which are incorporated herein by reference in their entirety.

TECHNICAL FIELD

The present invention relates to a liquid crystal polyester resin composition.

BACKGROUND ART

A liquid crystal polyester has excellent thin wall moldability and high heat resistance. Accordingly, the liquid crystal polyester is employed for surface mounting electronic components such as connectors obtained by using a reflow soldering step, relays, and bobbins. In the field of information communication, high integration, miniaturization, thinning the wall, and shortening the height of surface mounting electronic components have been progressing. Among these, a tendency of thinning the wall is significant in connector components.

Representative examples of thin-walled connectors include a board to board connector used for bonding printed wiring boards and a connector for an FPC used for connecting a flexible printed circuit board (also abbreviated as an FPC) and a flexible flat cable (also abbreviated as an FFC). The Board to Board connector or the connector for an FPC has been required to save the space in the area for mounting the connector, together with the miniaturization of an electronic device for which a printed wiring board is used. For example, a narrow pitch connector obtained by setting the pitch between metal terminals of the connector to 0.35 mm or less is provided. Further, a connector with a low height obtained by setting the thickness dimension (a so-called stacking height) in a state in which the connector is fitted to 0.6 mmt or less is also provided.

In a case where such demands for narrowing the pitch and shortening the height are intended to be satisfied, the dimension of a liquid crystal polyester molded product that holds a metal terminal needs to be decreased, and thus there is a possibility that the strength of the connector becomes extremely weak and the practical strength cannot be maintained. In other words, in a case where the thickness of a connector is decreased, a possibility that breakage such as twisting or cracking of the connector occurs is increased due to the stress generated at the time of handling or mounting the connector.

Therefore, the liquid crystal polyester serving as a molding material of a thin-walled connector typified by a board to board connector or a connector for an FPC is required to have both of excellent thin wall fluidity and thin wall strength.

For example, in order to fill a portion that is thin-walled by approximately 1.0 mmt with a resin, it is necessary to decrease the amount of a filler. However, in a case where a composition containing a small amount of a filler is used, the strength becomes insufficient, and this results in a problem of warpage deformation during a heat treatment (hereinafter, also referred to as a "reflow treatment") in a reflow soldering step at the time of mounting.

In addition, a gap is generated between a metal terminal and a circuit formed on a substrate in a case where a connector warps during the reflow soldering step. In this case, the solder cannot maintain the volume enough to fill the gap. Therefore, the solder is solidified in a state in which the metal terminal and the circuit are separated from each other. As the result, a bonding defect in which electric conduction cannot be made may occur.

Further, in a case where the connector is cooled to room temperature and warpage deformation occurs, the metal terminal is separated from the circuit and thus a bonding defect in which electric conduction cannot be made is caused.

Accordingly, it is desirable that warpage deformation in the connector at the time of the heat treatment in the reflow soldering step is small and also required that warpage deformation in the connector in a state in which the solder is solidified during the reflow soldering step is small.

Patent Document 1 discloses, as a liquid crystal polyester having excellent heat resistance, moldability, and mechanical characteristics, a liquid crystalline polyester resin composition containing at least 100 parts by weight of (A) liquid crystalline polyester resin and 10 to 100 parts by weight of (B) talc, in which the ratio (a1/a2) of the oil absorption amount (a1) (ml/100 g) of the (B) talc to the specific surface area (a2) ($m^2$/g) of the talc (B) in the composition is in a range of 14.0 to 26.0 (ml·g)/(100 g·$m^2$), and the number-average particle diameter is in a range of 10 to 30 μm.

Patent Document 2 discloses a liquid crystal polymer composition used for reducing warpage of a molded product and formed by blending 1 to 200 parts by weight of talc with an average particle diameter of 5 to 100 μm and an aspect ratio of 3.0 to 5.0 into 100 parts by weight of a liquid crystalline polymer.

Further, Patent Document 3 discloses, as a liquid crystalline polyester resin composition having excellent heat resistance and impact resistance, a liquid crystalline polyester resin composition formed by blending 10 to 150 parts by weight of talc with an average particle diameter of 2.5 to 3.5 μm and 10 to 150 parts by weight of glass fibers with an average fiber diameter of 3 to 9 μm into 100 parts by weight of the liquid crystalline polyester resin.

CITATION LIST

Patent Literature

[Patent Document 1] PCT International Publication No. WO2012/117475
[Patent Document 2] Japanese Unexamined Patent Application, First Publication No. 2008-138181
[Patent Document 3] Japanese Unexamined Patent Application, First Publication No. H04-76049

Summary of Invention

Technical Problem

Meanwhile, in current techniques, occurrence of warpage before and after the reflow treatment has been paid attention, but no attempt has been made to actively focus on the occurrence of warpage during the reflow treatment.

In the molded product obtained by using the resin composition described in Patent Document 1, the effect of reducing the amount of warpage during the reflow treatment is insufficient in terms that the thickness of the solder in a typical reflow soldering step is approximately 0.1 mm.

Further, the molded products obtained by using the resin compositions described in Patent Documents 2 and 3 each have a problem in that the effect of reducing the amount of warpage during the reflow treatment is insufficient even though the amount of warpage before the reflow treatment is reduced.

As described above, various examinations on the liquid crystal polyester resin composition used for a thin-walled connector have been performed, but are not sufficient in known techniques of the related art and further improvement has been required.

The present invention has been made in consideration of the above-described circumstances, and an object of the present invention is to provide a liquid crystal polyester resin composition which has a high fluidity, high thin wall strength, and solder resistance and from which a molded product formed by reducing warpage during the reflow treatment can be obtained.

Solution to Problem

The present invention provides the following [1] to [6].

[1] A liquid crystal polyester resin composition including: (A) liquid crystal polyester; (B) talc; and (C) mica, in which a total amount ((B)+(C)) of the (B) talc and the (C) mica is in a range of 5 parts by mass to 100 parts by mass with respect to 100 parts by mass of the (A) liquid crystal polyester, and a mass ratio ((B)/(C)) of a mass of the (B) talc to a mass of the (C) mica is in a range of 9/1 to 1/9.

[2] The liquid crystal polyester resin composition according to [1], further including: 5 parts by mass to 100 parts by mass of (D) glass fibers with respect to 100 parts by mass of the (A) liquid crystal polyester.

[3] The liquid crystal polyester resin composition according to [2], in which the number-average fiber length of the (D) glass fibers is in a range of 50 μm to 300 μm.

[4] The liquid crystal polyester resin composition according to [2], in which the number-average fiber length of the (D) glass fibers is in a range of 50 μm to 150 μm.

[5] The liquid crystal polyester resin composition according to any one of [1] to [4], in which the volume-average particle diameter of the (B) talc is in a range of 5 μm to 25 μm.

[6] The liquid crystal polyester resin composition according to any one of [1] to [5], in which the volume-average particle diameter of the (C) mica is in a range of 15 μm to 45 μm.

[7] A molded product, which is formed of the liquid crystal polyester resin composition according to any one of [1] to [6].

Advantageous Effects of Invention

According to the present invention, it is possible to provide a liquid crystal polyester resin composition which has a high fluidity, high thin wall strength, and solder resistance and from which a molded product formed by reducing warpage during the reflow treatment can be obtained.

DESCRIPTION OF EMBODIMENTS

<Liquid Crystal Polyester Resin Composition>

Figure 1:
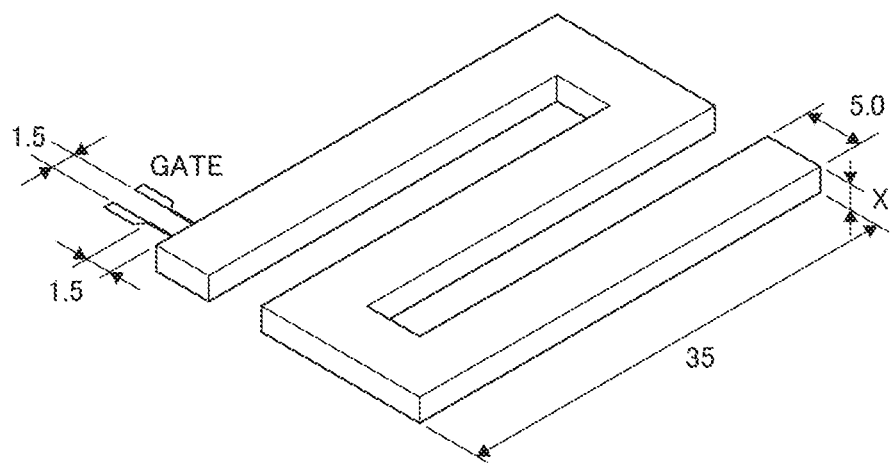
FIG. 1 is a schematic view showing a thin-walled flow measurement motif used in examples.

The present invention relates to a liquid crystal polyester resin composition including (A) liquid crystal polyester; (B) talc; and (C) mica, in which the total amount ((B)+(C)) of the (B) talc and the (C) mica is in a range of 5 parts by mass to 100 parts by mass with respect to 100 parts by mass of the (A) liquid crystal polyester, and the ratio ((B)/(C)) of the mass of the (B) talc to the mass of the (C) mica is in a range of 9/1 to 1/9.

In the liquid crystal polyester resin composition of the present invention, the (A) liquid crystal polyester, the (B) talc, and the (C) mica are used as indispensable components and the liquid crystal polyester resin composition contains the above-described specific amounts of these components. In this manner, the liquid crystal polyester resin composition of the present invention has high thin wall strength and blister resistance while having a high fluidity. Further, a molded product molded using the liquid crystal polyester resin composition of the present invention is capable of reducing warpage during a reflow treatment.

Hereinafter, each material used in the present invention will be described.

<<(A) Liquid Crystal Polyester>>

The liquid crystal polyester of the present invention is a liquid crystal polyester exhibiting liquid crystalline properties in a melted state, and it is preferable that the liquid crystal polyester is melted at a temperature of 450° C. or less. Further, the liquid crystal polyester may be a liquid crystal polyester amide, a liquid crystal polyester ether, a liquid crystal polyester carbonate, or a liquid crystal polyester imide. It is preferable that the liquid crystal polyester is a wholly aromatic liquid crystal polyester formed by using only an aromatic compound as a raw material monomer.

Typical examples of the liquid crystal polyester include those obtained by polymerizing (polycondensing) at least one compound selected from the group consisting of an aromatic hydroxycarboxylic acid, an aromatic dicarboxylic acid, an aromatic diol, an aromatic hydroxyamine, and an aromatic diamine; those obtained by polymerizing a plurality of kinds of aromatic hydroxycarboxylic acids; those obtained by polymerizing at least one compound selected from the group consisting of an aromatic dicarboxylic acid, an aromatic diol, an aromatic hydroxyamine, and an aromatic diamine; and those obtained by polymerizing an aromatic hydroxycarboxylic acid and a polyester such as polyethylene terephthalate.

Here, from the viewpoint of case of production, some or all of the aromatic hydroxycarboxylic acid, the aromatic dicarboxylic acid, the aromatic diol, the aromatic hydroxyamine, and the aromatic diamine may each independently be substituted with polymerizable derivatives.

Examples of the polymerizable derivatives of the compound containing a carboxyl group such as an aromatic hydroxycarboxylic acid or an aromatic dicarboxylic acid include a derivative (an ester) obtained by converting a carboxyl group to an alkoxycarbonyl group or an aryloxycarbonyl group; a derivative (an acid halide) obtained by converting a carboxyl group to a haloformyl group; and a derivative (an acid anhydride) obtained by converting a carboxyl group to an acyloxycarbonyl group.

Examples of the polymerizable derivatives of the compound containing a hydroxyl group such as an aromatic hydroxycarboxylic acid, an aromatic diol, or an aromatic hydroxyamine include a derivative (an acylated product) obtained by acylating a hydroxyl group so ac to be converted to an acyloxyl group.

Examples of the polymerizable derivatives of the compound containing an amino group such as an aromatic hydroxyamine or an aromatic diamine include a derivative (an acylated product) obtained by acylating an amino group so as to be converted to an acylamino group.

Among the polymerizable derivatives provided as exemplary examples above, as the raw material monomer of the liquid crystal polyester, a polymerizable derivative in which a phenolic hydroxyl group forms lower carboxylic acids and an ester, in other words, an acylated product obtained by acylating an aromatic hydroxycarboxylic acid and an aromatic diol is preferable.

It is preferable that the liquid crystal polyester has a repeating unit represented by Formula (1) (hereinafter, also referred to as a "repeating unit (1))" and more preferable that the liquid crystal polyester has the repeating unit (1), a repeating unit represented by Formula (2) (hereinafter, also referred to as a "repeating unit (2)"), and a repeating unit represented by Formula (3) (hereinafter, also referred to as a "repeating unit (3)")

$$—O—Ar^1—CO— \quad (1)$$

$$—CO—Ar^2—CO— \quad (2)$$

$$—X—Ar^3—Y— \quad (3)$$

(In Formulae (1) to (3), $Ar^1$ represents a phenylene group, a naphthylene group, or a biphenylene group. $Ar^2$ and $Ar^3$ each independently represent a phenylene group, a naphthylene group, a biphenylene group, or a group represented by Formula (4). X and Y each independently represent an oxygen atom or an imino group (—NH—). The hydrogen atoms in the group represented by $Ar^1$, $Ar^2$, or $Ar^3$ may each independently be substituted with a halogen atom, an alkyl group, or an aryl group.)

$$—Ar^4—Z—Ar^5— \quad (4)$$

($Ar^4$ and $Ar^5$ each independently represent a phenylene group or a naphthylene group. Z represents an oxygen atom, a sulfur atom, a carbonyl group, a sulfonyl group, or an alkylidene group. The hydrogen atoms in the group represented by $Ar^4$ or $Ar^5$ may each independently be substituted with a halogen atom, an alkyl group having 1 to 10 carbon atoms, or an aryl group having 6 to 20 carbon atoms.)

Examples of the halogen atom which can be substituted with the hydrogen atom include a fluorine atom, a chlorine atom, a bromine atom, and an iodine atom.

Examples of the alkyl group having 1 to 10 carbon atoms which can be substituted with the hydrogen atom include a methyl group, an ethyl group, a 1-propyl group, an isopropyl group, a 1-butyl group, an isobutyl group, a sec-butyl group, a tert-butyl group, a 1-hexyl group, a 2-ethylhexyl group, a 1-octyl group, and a 1-decyl group.

Examples of the aryl group having 6 to 20 carbon atoms which can be substituted with the hydrogen atoms include a monocyclic aromatic group such as a phenyl group, an orthotolyl group, a metatolyl group, or a paratolyl group; and a fused aromatic group such as a 1-naphthyl group or a 2-naphthyl group.

In a case where one or more hydrogen atoms in the group represented by $Ar^1$, $Ar^2$, $Ar^3$, $Ar^4$, or $Ar^5$ are substituted with the halogen atom, the alkyl group having 1 to 10 carbon atoms, or the aryl group having 6 to 20 carbon atoms, the number of groups substituting the hydrogen atoms is preferably 1 or 2 and more preferably 1, each independently for each group represented by $Ar^1$, $Ar^2$, $Ar^3$, $Ar^4$, or $Ar^5$.

Examples of the alkylidene group include a methylene group, an ethylidene group, an isopropylidene group, a 1-butylidene group, and a 2-ethylhexylidene group, and the number of carbon atoms thereof is typically in a range of 1 to 10.

The repeating unit (1) is a repeating unit derived from an aromatic hydroxycarboxylic acid.

Examples of the aromatic hydroxycarboxylic acid include 4-hydroxybenzoic acid, metahydroxybenzoic acid, 2-hydroxy-6-naphthoic acid, 2-hydroxy-3-naphthoic acid, 1-hydroxy-5-naphthoic acid, 4-hydroxy-4'-carboxydiphenyl ether, and an aromatic hydroxycarboxylic acid in which some hydrogen atoms in an aromatic ring of any of these aromatic hydroxycarboxylic acids are substituted with a substituent selected from the group consisting of an alkyl group, an aryl group, and a halogen atom.

The aromatic hydroxycarboxylic acid may be used alone or in combination of two or more kinds thereof in the production of the liquid crystal polyester.

As the repeating unit (1), a repeating unit in which $Ar^1$ represents a 1,4-phenylene group (that is, a appealing unit derived from 4-hydroxybenzoic acid) and a repeating unit in which $Ar^1$ represents a 2,6-naphthylene group (that is, a repeating unit derived from 6-hydroxy-2-naphthoic acid) are preferable.

The repeating unit (2) is a repeating unit derived from an aromatic dicarboxylic acid.

Examples of the aromatic dicarboxylic acid include terephthalic acid, isophthalic acid, biphenyl-4,4'-dicarboxylic acid, 2,6-naphthalenedicarboxylic acid, diphenylether-4,4'-dicarboxylic acid, diphenylthioether-4,4'-dicarboxylic acid, and an aromatic dicarboxylic acid in which some hydrogen atoms in an aromatic ring of any of these aromatic dicarboxylic acids are substituted with a substituent selected from the group consisting of an alkyl group, an aryl group, and a halogen atom.

The aromatic dicarboxylic acid may be used alone or in combination of two or more kinds thereof in the production of the liquid crystal polyester.

As the repeating unit (2), a repeating unit in which $Ar^2$ represents a 1,4-phenylene group (that is, a repealing unit derived from terephthalic acid), a repeating unit in which $Ar^2$ represents a 1,3-phenylene group (that is, a repeating unit derived from isophthalic acid), a repeating unit in which $Ar^2$ represents a 2,6-naphthylene group (that is, a repeating unit derived from 2,6-naphthalenedicarboxylic acid), and a repeating unit in which $Ar^2$ represents a diphenylether-4,4'-diyl group (that is, a repeating unit derived from diphenylether-4,4'-dicarboxylic acid) are preferable.

The repeating unit (3) is a repealing unit derived from an aromatic diol, an aromatic hydroxyamine, or an aromatic diamine.

Examples of the aromatic diol, the aromatic hydroxyamine, or the aromatic diamine include 4,4'-dihydroxybiphenyl, hydroquinone, resorcin, 4,4'-dihydroxydiphenyl ketone, 4,4'-dihydroxydiphenyl ether, bis(4-hydroxyphenyl) methane, 1,2-bis(4-hydroxyphenyl)ethane, 4,4'-dihydroxydiphenyl sulfone, 4,4'-dihydroxydiphenyl thioether, 2,6-dihydroxynaphthalene, 1,5-dihydroxynaphthalene, 4-aminophenol, 1,4-phenylenediamine, 4-amino-4'-hydroxybiphenyl, and 4,4'-diaminobiphenyl.

The aromatic diol, the aromatic hydroxyamine, or the aromatic diamine may be used alone or in combination of two or more kinds thereof in the production of the liquid crystal polyester.

As the repeating unit (3), a repeating unit in which $Ar^3$ represents a 1,4-phenylene group (that is, a repeating unit derived from hydroquinone, 4-aminophenol, or 1,4-phenylenediamine) and a repeating unit in which $Ar^3$ represents a 4,4'-biphenylylene group (that is, a repealing unit derived from 4,4'-dihydroxybiphenyl, 4-amino-4'-hydroxbiphenyl, or 4,4'-diaminobiphenyl) are preferable.

In the present specification, the term "derived" indicates that the chemical structure is changed due to polymerization.

Further, in a case where a molded product obtained from the liquid crystal polyester resin composition of the present invention is required to have particularly excellent heat resistance, it is preferable that the number of these substituents is small and particularly preferable that the liquid crystal polyester resin composition docs not have a substituent such as an alkyl group.

Next, suitable combinations of the above-described structural units will be described.

In the present embodiment, it is preferable that the above-described structural units of the liquid crystal polyester are used in combinations shown in any of the following [a] to [p].

[a]: Combination of 4-hydroxybenzoic acid, terephthalic acid, isophthalic acid, and 4,4'-dihydroxybiphenyl

[b]: Combination of 4-hydroxybenzoic acid, terephthalic acid, and 4,4'-dihydroxybiphenyl

[c]: Combination of 4-hydroxybenzoic acid and 2-hydroxy-6-naphthoic acid

[d]: Combination of 4-hydroxybenzoic acid, terephthalic acid, isophthalic acid, 4,4'-dihydroxybiphenyl, and hydroquinone

[e]: Combination of 4-hydroxybenzoic acid, terephthalic acid, 2,6-naphthalene dicarboxylic acid, hydroquinone, and 4,4'-dihydroxybiphenyl

[f]: Combination of 4-hydroxybenzoic acid, terephthalic acid, 2,6-naphthalene dicarboxylic acid, and hydroquinone

[g]: Combination of 4-hydroxybenzoic acid, 2-hydroxy-6-naphthoic acid, terephthalic acid, and 4,4'-dihydroxybiphenyl

[h]: Combination of 4-hydroxybenzoic acid, 2-hydroxy-6-naphthoic acid, terephthalic acid, isophthalic acid, and 4,4'-dihydroxybiphenyl

[i]: Combination of 4-hydroxybenzoic acid, 2-hydroxy-6-naphthoic acid, terephthalic acid, 4-aminophenol, and 4,4'-dihydroxybiphenyl

[j]: Combination of 4-hydroxybenzoic acid, 2-hydroxy-6-naphthoic acid, terephthalic acid, and hydroquinone

[k]: Combination of 4-hydroxybenzoic acid, 2,6-naphthalene dicarboxylic acid, terephthalic acid, hydroquinone, and 4,4'-dihydroxybiphenyl

[l]: Combination of 4-hydroxybenzoic acid, 2-hydroxy-6-naphthoic acid, 2,6-naphthalene dicarboxylic acid, and hydroquinone

[m]: Combination of 2-hydroxy-6-naphthoic acid, terephthalic acid, and 4-aminophenol

[n]: Combination of 2-hydroxy-6-naphthoic acid, terephthalic acid, 2,6-naphthalene dicarboxylic acid, 4,4'-dihydroxybiphenyl, and hydroquinone

[o]: Combination of 4-hydroxybenzoic acid, 2-hydroxy-6-naphthoic acid, terephthalic acid, 2,6-naphthalene dicarboxylic acid, and hydroquinone

[p]: Combination of 2-hydroxy-6-naphthoic acid, terephthalic acid, isophthalic acid, 2,6-naphthalene dicarboxylic acid, and hydroquinone Among the combinations [a] to [p], the combination [a] in which the molar ratio of 4,4'-dihydroxybiphenyl to 4-hydroxybenzoic acid (molar ratio of 4,4'-dihydroxybiphenyl/4-hydroxybenzoic acid) is in a range of 0.2 to 1.0, the molar ratio of the total amount of terephthalic acid and isophthalic acid to 4,4'-dihydroxybiphenyl (molar ratio of (terephthalic acid+isophthalic acid)/4,4'-dihydroxybiphenyl) is in a range of 0.9 to 1.1, and the molar ratio of isophthalic acid to terephthalic acid (a molar ratio of isophthalic acid/terephthalic acid) is greater than 0 and 1 or less is preferable. In a case where such combinations of the above-described structural units are used and the molar ratios thereof are satisfied, the melt fluidity of the liquid crystal polyester resin composition is further improved, and the impact resistance of a molded product to be obtained can be improved.

The amount of the repeating unit (1) is typically 30% by mole or greater, preferably in a range of 30% to 80% by mole, more preferably in a range of 35% to 70% by mole, and still more preferably in a range of 35% to 65% by mole with respect to the total amount of all repeating units (a value obtained by dividing the mass of each repeating unit constituting liquid crystal polyester by the formula weight thereof to acquire the amount (mol) equivalent to the substance amount of each repeating unit and summing these values).

The amount of the repeating unit (2) is typically 35% by mole or less, preferably in a range of 10% to 35% by mole, more preferably in a range of 15% to 30% by mole, and still more preferably in a range of 17.5% to 27.5% by mole with respect to the total amount of all repeating units.

The amount of the repeating unit (3) is typically 35% by mole or less, preferably in a range of 10% to 35% by mole, more preferably in a range of 15% to 30% by mole, and still more preferably in arrange of 17.5% to 27.5% by mole with respect to the total amount of all repeating units.

The ratio of the amount of the repeating unit (2) to the amount of the repeating unit (3) is expressed as [amount of repeating unit (2)]/[amount of repeating unit (3)] (mol/mol) and is typically in a range of 0.9/1 to 1/0.9, preferably in a range of 0.95/1 to 1/0.95, and more preferably in a range of 0.98/1 to 1/0.98.

Further, the liquid crystal polyester may have two or more kinds of respective repeating units (1) to (3) independently. In addition, the liquid crystal polyester may have a repeating unit other than the repeating units (1) to (3), and the content thereof is typically 10% by mole or less and preferably 5% by mole or less with respect to the total amount of all repeating units.

From the viewpoint that the melt viscosity is easily decreased, it is preferable that the liquid crystal polyester has, as the repeating unit (3), a repeating unit in which X and Y each represent an oxygen atom, that is, a repeating unit derived from an aromatic diol and more preferable that the liquid crystal has, as the repeating unit (3), only a repeating unit in which X and Y each represent an oxygen atom.

It is preferable that the liquid crystal polyester is produced by melt-polymerizing a raw material monomer corresponding to a repeating unit constituting the liquid crystal polyester and performing solid phase polymerization of the obtained polymer (hereinafter, also referred to as a "prepolymer"). In this manner, a high-molecular weight liquid crystal polyester with high heat resistance, strength, and rigidity can be produced with excellent operability.

The melt polymerization may be performed in the presence of a catalyst, and examples of the catalyst include a metal compound such as magnesium acetate, stannous acetate, tetrabutyl titanate, lead acetate, sodium acetate, potassium acetate, or antimony trioxide; and a nitrogen-containing heterocyclic compound such as 4-(dimethylamino)pyridine or 1-methylimidazole. Among these, 1-methylimidazole is preferable.

The flow beginning temperature of the liquid crystal polyester is preferably in a range of 270° C. to 400° C. and more preferably in a range of 280° C. to 380° C. In a case where the flow beginning temperature is in the above-described range, the fluidity of the liquid crystal polyester composition is improved, and the heat resistance tends to be improved.

Further, in the case where the flow beginning temperature is in the above-described range, thermal degradation is unlikely to occur during melt molding carried out to obtain a molded product from the liquid crystal polyester.

The flow beginning temperature is also referred to as a flow temperature and indicates a temperature showing a melt viscosity of 4800 Pa·s (48000 poise) at the time of melting and extruding the liquid crystal polyester from a nozzle with an inner diameter of 1 mm and a length of 10 mm while raising the temperature at a rate of 4° C./min under a load of 9.8 MPa using a capillary rheometer. Further, the flow beginning temperature is an index indicating the molecular weight of the liquid crystal polyester (see "Synthesis, Molding and Application of Liquid Crystalline Polymers", edited by KOIDE Naoyuki, p. 95, published by CMC Publishing CO., LTD., on Jun. 5, 1987).

The liquid crystal polyester may be used alone or in combination of two or more kinds thereof. In a case where two or more kinds thereof are used in combination, the combination and the ratio thereof can be optionally set.

According to one aspect of the present invention, the amount of the (A) liquid crystal polyester to be blended is preferably in a range of 45 parts by mass to 90 parts by mass, more preferably in a range of 50 parts by mass to 80 parts by mass, and still more preferably in a range of 50 parts by mass to 70 parts by mass with respect to 100 parts by mass of the liquid crystal polyester resin composition.

<<(B) Talc>>

The talc used in the present invention Is a ground mineral formed of magnesium hydroxide and a silicate mineral. The tide has a structure formed by interposing an octahedral structure formed of three magnesium (Mg) oxides and magnesium hydroxides between four tetrahedral structures formed of a silicon (Si) oxide having four atoms.

Examples of a method of producing the tale include dry grinding methods, for example, a milling type grinding method using a roller mill or a Raymond mill; an impact type grinding method using an atomizer, a hammer mill, or a micron mill; and a collision type grinding method using a jet mill or a ball mill.

Further, a wet grinding method of performing grinding using a ball mill, a bead mill, a wet jet mill, or a discoplex by bringing ground talc powder into contact with water in a slurry state in which the viscosity thereof has been adjusted so as to be flowable. Among the above-described production methods, from the viewpoints of economic efficiency and availability, the dry grinding method is preferable.

The surface of talc may be treated using a coupling agent or the like for the purpose of improving the wettability of the talc and a resin. Further, talc which has been subjected to a heat treatment for the purpose of removing impurities and hardening the talc may be used. In addition, talc which has been compressed for the purpose of improving the handleability may be used.

In a case where the talc is allowed to pass through a sieve having meshes with a diameter of 45 µm, the amount of the talc remaining on the sieve having meshes with a diameter of 45 µm is preferably 1.0% by mass or less with respect to the total mass of the talc which has put on the sieve.

In a case where the content thereof is 1.0% by mass or less, clogging in a thin-walled portion during molding is suppressed, the moldability is improved, and the thin wall strength can be improved. The amount of the talc remaining on the sieve having meshes with a diameter of 45 µm is preferably 0.8% by mass or less and more preferably 0.6% by mass or less with respect to the total mass of the talc which has put on the sieve.

The ignition loss (Ig. Loss) of the talc is preferably 7% or less, more preferably 6% or less, and particularly preferably 5% or less. In a case where the Ig. loss decreases, decomposition of the liquid crystal polyester is suppressed and thus the solder resistance is improved. Further, the Ig. loss in the present invention is set as a value measured in conformity with JIS M8853 1998.

In the present invention, the volume-average particle diameter of the (B) talc is preferably 5.0 µm or greater, more preferably 5.5 µm or greater, and particularly preferably 6.0 µm or greater.

Further, the volume-average particle diameter thereof is preferably 25 µm or less, more preferably 24.5 µm or less, and particularly preferably 24 µm or less. The upper limit and the lower limit can be optionally set in combination.

According to another aspect of the present invention, the volume-average particle diameter of the (B) talc is preferably in a range of 5.0 µm to 25 µm, more preferably in a range of 5.5 µm to 24.5 µm, and still more preferably in a range of 6.0 µm to 24 µm.

In the present invention, the volume-average particle diameter of talc can be measured according to a laser diffraction method. The volume-average particle diameter of talc can be calculated in a state of dispersing the talc in water under the following measurement conditions using a scattering type particle size distribution measuring device "LA-950V2" (manufactured by HORIBA, Ltd.) as a measuring device.

[Measurement Conditions]
Particle refractive index: 1.57-0.1i
Dispersion medium: water
Dispersion medium refractive index: 1.33

In the present invention, the amount of the (B) talc to be blended is preferably 1 part by mass or greater, preferably 3 parts by mass or greater, preferably 5 parts by mass or greater, more preferably 10 parts by mass or greater, and particularly preferably 12 parts by mass or greater with respect to 100 parts by mass of the (A) liquid crystal polyester. In addition, the amount thereof is preferably 90 parts by mass or less, more preferably 80 parts by mass or less, and particularly preferably 50 parts by mass or less with respect to 100 parts by mass of the (A) liquid crystal polyester.

The upper limit and the lower limit can be optionally set in combination

According to a still another aspect of the present invention, the amount of the (B) talc to be blended is preferably in a range of 1 part by mass to 90 parts by mass, preferably in a range of 3 parts by mass to 90 parts by mass, preferably in a range of 5 pails by mass to 90 parts by mass, more preferably in a range of 10 parts by mass to 80 parts by mass, and still more preferably in a range of 12 parts by mass to 50 parts by mass with respect to 100 parts by mass of the (A) liquid crystal polyester.

According to one aspect of the present invention, the amount of the (B) talc to be blended is preferably in a range of 1 part by mass to 100 parts by mass, more preferably in a range of 3 parts by mass to 80 parts by mass, and still more preferably in a range of 5 parts by mass to 50 parts by muss with respect to 100 parts by mass of the liquid crystal polyester resin composition.

<<(C) Mica>>

The mica is a ground silicate mineral containing aluminum, potassium, magnesium, sodium, iron, and the like. The mica is a mineral having a structure formed by interposing an octahedral structure formed of two or three metal oxides and metal hydroxides between four tetrahedral structures formed of oxides of silicon (Si) having three atoms and aluminum (Al) having one atom.

The mica used in the present invention may be any of muscovite, phlogopite, fluorophlogopite, four silicon mica, and artificially produced synthetic mica. The mica may be formed by containing two or more kinds thereof.

It is preferable that the mica used in the present invention is practically formed of only muscovite.

Examples of a method of producing the mica include water flow type grinding, wet grinding, dry ball mill grinding, pressured roller mill grinding, air flow type jet mill grinding, and dry grinding using an impact grinder such as an atomizer. From the viewpoint that the mica can be thinly and finely ground, it is preferable to use mica produced according to a wet grinding method.

It is necessary to disperse a ground material in water in a case where wet grinding is performed, polyaluminum chloride, aluminum sulfate, aluminum sulfate, ferrous sulfate, ferric sulfate, copallas chloride, polyiron sulfate, polyferric chloride, an iron-silica inorganic polymer coagulant, a ferric chloride-silica inorganic polymer coagulant, or a coagulation sedimentation agent or a sedimentation assistant such as slaked lime ($Ca(OH)_2$), caustic soda (NaOH), or soda ash ($Na_2CO_3$) is typically added for the purpose of increasing the dispersion efficiency of the ground material, but mica which does not use a coagulation sedimentation agent or a sedimentation assistant at the time of wet grinding is preferable as the mica used in the present invention because decomposition of the liquid crystal polyester may be caused.

In the presents invention, the volume-average particle diameter of the (C) mica is preferably 20 µm or greater, more preferably 21 µm or greater, and particularly preferably 22 µm or greater. According to another aspect of the present invention, the volume-average particle diameter of the (C) mica is preferably 15 µm or greater. Further, the volume-average particle diameter thereof is preferably 45 µm or less, more preferably 44 µm or less, and particularly preferably 43 µm or less.

The upper limit and the lower limit can be optionally set in combination.

According to still another aspect of the present invention, the volume average particle diameter of the (C) mica is in a range of 15 µm to 45 µm, more preferably in a range of 20 µm to 45 µm, still more preferably in a range of 21 µm to 44 µm, and particularly preferably in a range of 22 µm to 43 µm.

In the present invention, the volume-average particle diameter of mica can be measured according to a laser diffraction method. The volume-average particle diameter of talc can be calculated in a state of dispersing the mica in water under the following measurement conditions using a scattering type particle size distribution measuring device "LA-950V2" (manufactured by HORIBA, Ltd.) as a measuring device.

[Measurement Conditions]
Particle refractive index: 1.59-0.1i
Dispersion medium: water
Dispersion medium refractive index: 1.33

The mica with such a volume-average particle diameter has improved miscibility with the liquid crystal polyester and is capable of further improving the fluidity of the liquid crystal polyester resin composition of the present invention.

The amount of the (C) mica to be blended is preferably 1 part by mass or greater, more preferably 3 parts by mass or greater, and particularly preferably 5 parts by mass or greater with respect to 100 parts by mass of the (A) liquid crystal polyester. Further, the amount thereof is preferably 90 parts by mass or less, more preferably 50 parts by mass or less, still more preferably 30 parts by mass or less, and particularly preferably 20 parts by mass or less with respect to 100 parts by mass of the (A) liquid crystal polyester.

The upper limit and the lower limit can be optionally set in combination.

According to another aspect of the present invention, the amount of the (C) mica to be blended is preferably in a range of 1 part by mass to 90 parts by mass, more preferably in a range of 3 parts by mass to 50 parts by mass, still more preferably in a range of 3 parts by mass to 30 parts by mass, and particularly preferably in a range of 5 parts by mass to 20 parts by mass with respect to 100 parts by mass of the (A) liquid crystal polyester.

In a case where the amount or the mica to be blended is greater than or equal to the above-described lower limit, occurrence of warpage during the reflow treatment in a molded product to be obtained and particularly in a long connector is sufficiently suppressed. Further, in a case where the amount of the mica to be blended is less than or equal to the above-described upper limit, the fluidity at the lime of melt molding is improved so that the molding is easily carried out.

In addition, it is advantageous that the liquid crystal polyester resin composition in which the amount of the (C) mica to lie blended is in the above-described range with respect to the amount of the liquid crystal polyester is molded to particularly a long connector from the viewpoint that the heat resistance of this connector can be improved, and a molded product with practical blister resistance is obtained.

According to one aspect of the present invention, the amount of the (C) mica to be blended is preferably in a range of 1 part by mass to 100 parts by mass, more preferably in a range of 2 pans by mass to 30 parts by mass, and still more preferably in a range of 3 parts by mass to 20 parts by mass with respect to 100 parts by mass of the liquid crystal polyester resin composition.

In the present invention, the total amount ((B)+(C)) of the (B) talc and the (C) mica is in a range of 5 parts by mass to 100 parts by mass with respect to 100 parts by mass of the (A) liquid crystal polyester, and the mass ratio ((B)/(C)) is in a range of 9/1 to 1/9.

The mass ratio ((B)+(C)) is preferably 10 parts by mass or greater, more preferably 15 parts by mass or greater, and particularly preferably 18 parts by mass or greater. Further, the mass ratio thereof is preferably 80 parts by mass or less, more preferably 70 parts by mass or less, and particularly preferably 60 parts by mass or less.

The upper limit and the lower limit can be optionally set in combination.

According to another aspect of the present invention, the mass ratio ((B)+(C)) is preferably in a range of 10 parts by mass to 80 parts by mass, more preferably in a range of 15 parts by mass to 70 parts by mass, and still more preferably in a range of 18 parts by mass to 60 parts by mass.

In a case where the total amount ((B)+(C)) is in the above-described range, occurrence of warpage during the reflow treatment of the molded product molded using the liquid crystal polyester resin composition according to the present invention can be suppressed.

In the present invention, the mass ratio ((B)/(C)) is in a range of 9/1 to 1/9, preferably in a range of 8/1 to 1/1, more preferably in a range of 7/1 to 1/1, and particularly preferably in a range of 6/1 to 1/1.

In a case where the mass ratio ((B)/(C)) is in the above-described range, occurrence of warpage during the reflow treatment of the molded product molded using the liquid crystal polyester resin composition according to the present invention can be suppressed.

<<Other Components>>

The liquid crystal polyester resin composition of the present invention may contain a filler or an additive other than the liquid crystal polyester, the talc, and the mica. From the viewpoint of improving the mechanical strength of the molded product to be obtained, a fibrous filler is preferable and a fibrous filler (fibrous inorganic filler) formed of an inorganic material is more preferable as the filler.

Examples of the fibrous inorganic filler include glass fibers, wollastonite, aluminum borate whiskers, potassium titanium whiskers, silica alumina fibers, and alumina fibers. Among these, glass fibers, carbon fibers, wollastonite, aluminum borate whiskers, and potassium titanate whiskers are preferable. In a case where a fibrous inorganic filler is used, the fibrous inorganic filler may be used alone or in combination of two or more kinds thereof.

In the present invention, it is preferable that the liquid crystal polyester resin composition contains glass fibers among the above-described examples.

In the present specification, the "glass fiber" indicates "glass having a fiber diameter of 1 to 50 μm and an aspect ratio of 2 to 1000". The diameter of the fiber can be measured according to the following method. The "aspect ratio" in the present specification indicates the ratio of the fiber length (the length of a long axis) to the fiber diameter (the length of a short axis). The method of measuring the "fiber length" and the "fiber diameter" will be described below.

<<(D) Glass Fiber>>

The number-average fiber length of the glass fibers is preferably 50 μm or greater, more preferably 70 μm or greater, and particularly preferably 100 μm or greater. Further, from the viewpoint of the fluidity of the liquid crystal polyester resin composition, the number-average fiber length thereof is preferably 300 μm or less, more preferably 250 μm or less, and particularly preferably 200 μm or less.

The upper limit and the lower limit can be optionally set in combination.

According to another aspect of the present invention, the number-average fiber length of the glass fibers is preferably in a range of 50 μm to 300 μm, more preferably in a range of 70 μm to 250 μm, and still more preferably in a range of 100 μm to 200 μm.

The amount of the (D) glass fibers to be blended is preferably in a range of 5 parts by mass to 100 parts by mass with respect to 100 parts by mass of the (A) liquid crystal polyester.

According to one aspect of the present invention, the amount of the (D) glass fibers to be blended is preferably in a range of 0 part by mass to 100 parts by mass, more preferably in a range of 3 parts by mass to 50 parts by mass, and still more preferably in a range of 15 parts by mass to 30 parts by mass with respect to 100 parts by mass of the liquid crystal polyester resin composition.

<Glass Fiber Length>

According to a method of measuring the number-average fiber length of the glass fibers, 5 g of pellets formed of the composition containing glass fibers are healed in a muffle furnace ("FP410", manufactured by Yamato Scientific Co., Ltd.) at 600° C. for 4 hours in an air atmosphere so that the resin is removed. The number-average fiber length is calculated by dispersing the obtained ash residues containing the glass fibers in an ethylene glycol solution, applying ultrasonic waves to the solution for 3 minutes, dropping several drops of the dispersion liquid on slide glass, loosening the dispersion liquid such that the fibrous filler does not overlap on the slide glass, placing cover glass thereon, adjusting the magnification of a video microscope ("VHX1000", manufactured by Keyence Corporation) to focus on the outline of the glass fibers at a magnification of 100 times, and measuring the lengths of 500 glass fibers. When the aspect ratios of the glass fibers are calculated as described above, the number-average fiber length measured using the above-described method can be used as the fiber length.

The "fiber diameter" of the glass fibers in the present specification indicates a value measured using the "A method" among the methods described in "7.6 monofilament diameter" of JIS R3420: 2013 unless otherwise specified.

More specific examples of the glass fibers include glass fibers produced using various methods, such as long fiber type chopped glass fibers which have been cut-processed into a predetermined length immediately after spinning strands spun from a glass melting step; and short fiber type milled glass fibers formed by grinding glass fibers or cutting fibers into an extremely short size. These may be used in combination of two or more kinds thereof.

The glass fibers may be treated by a surface treatment agent, for example, a coupling agent such as a silane-based coupling agent or a titanium-based coupling agent.

From the viewpoint of the mechanical strength, weakly alkaline glass fibers are preferable. Glass fibers in which the amount of silicon oxide is in a range of 50% to 80% by mass with respect to the total mass of the glass fibers are preferable, and glass fibers in which the amount of silicon oxide is in a range of 65% to 77% by mass with respect to the total mass of glass fibers are more preferable.

The glass fibers may be coated or bundled with a thermoplastic resin such as a urethane resin, an acrylic resin, or an ethylene/vinyl acetate copolymer; and a thermosetting resin such as an epoxy resin.

In a case where the glass fibers are coated or bundled with the thermoplastic resin or the thermosetting resin, the mass of the thermoplastic resin, the bundling agent, the coupling agent, and other surface treatment agents is not included in the mass of the glass fibers at the time at which the amount of the (D) glass fibers to be blended with respect to 100 parts by mass of the (A) liquid crystal polyester is calculated.

In the present invention, in order to improve the dispersibility of glass fibers, it is effective to use means for increasing the rotational speed of the screw at the time of performing melt kneading or means for decreasing the cylinder temperature, increasing the melt viscosity of the molten resin, and increasing the shear force.

<<Additive Component>>

Examples of the additive which may be contained in the liquid crystal polyester resin composition of the present invention include resins other than the liquid crystal polyester and known additives in the technical field.

Examples of the known additives in the technical field include higher fatty acid esters, release modifiers such as metal soaps, colorants such as dyes or pigments, antioxidants, thermal stabilizers, ultraviolet absorbing agents, antistatic agents, surfactants, flame retardants, and plasticizers. Further, additives having external lubricant effects such as higher fatty acids, higher fatty acid esters, higher fatty acid metal salts, and fluorocarbon-based surfactants are also exemplary examples. Similar to the fibrous inorganic filler, the kind and the amount of these additives to be used are determined such that the excellent fluidity of the liquid crystal polyester resin composition of the present invention is not extremely degraded.

<Carbon Black>

In the present embodiment, it is preferable to use carbon black as the colorant described as the additive component.

Examples of the carbon black used in the embodiment of the present invention include channel black type carbon black, furnace black type carbon black, lamp black type carbon black, thermal black type carbon black, ketjen black type carbon black, and naphthalene black type carbon black. Further, the liquid crystal polyester resin composition may contain two or more kinds of these. Among these, particularly furnace black type carbon black and lamp black type carbon black can be preferably used, and commercially available carbon black for coloring can also be used as long as the carbon black has the above-described desired characteristics.

<Release Agent>

In the present embodiment, the molding processability can be improved by adding a release agent as the additive component. Examples of the release agent include montanoic acid and a salt thereof, an ester thereof, a half ester thereof, stearyl alcohol, stearamide, and polyethylene wax, and preferred examples thereof include a fatty acid ester of pentaerythritol.

The amount of the release agent to be blended is typically in a range of 0.1 to 0.7 parts by mass and more preferably in a range of 0.3 to 0.6 parts by mass with respect to 100 parts by mass of the liquid crystal polyester. In a case where the amount of the release agent to be blended is in the above-described range, there is a tendency that mold contamination or blisters of a molded product are unlikely to occur, and a releasing effect is obtained.

<Resin Which may be Contained in Addition to Liquid Crystal Polyester>

Examples of the resin other than the liquid crystal polyester include a thermoplastic resin other than the liquid crystal polyester such as polypropylene, polyamide, polyester other than the liquid crystal polyester, polysulfone, polyether sulfone, polyphenylene sulfide, polyether ketone, polycarbonate, polyphenylene ether, or polyetherimide; and a thermosetting resin such as a phenol resin, an epoxy resin, a polyimide resin, or a cyanate resin. The amount of the resin other than the liquid crystal polyester is typically in a range of 0 to 20 parts by mass with respect to 100 parts by mass of the liquid crystal polyester.

According to one aspect of the present invention, the load deflection temperature under a load of 1.82 MPa measured according to the method described in examples, in which the liquid crystal polyester resin composition of the present invention is described, is preferably in a range of 240° C. to 290° C., more preferably in a range of 240° C. to 280° C., and still more preferably in a range of 245° C. to 275° C.

According to still another aspect of the present invention, the solder resistance temperature measured according to the method described in examples, in which the liquid crystal polyester resin composition of the present invention is described, is preferably in a range of 250° C. to 300'C, more preferably in a range of 260° C. to 300° C., and still more preferably in a range of 270° C. to 300° C.

According to still another aspect of the present invention, the warpage amount after the first reflow treatment measured according to the method described in examples, in which the liquid crystal polyester resin composition of the present invention is described, is preferably in a range of 0.10 to 0.20 mm, more preferably in a range of 0.10 to 0.18 mm, and still more preferably in a range of 0.10 to 0.15 mm.

According to even still another aspect of the present invention, the warpage amount during the first reflow treatment measured according to the method described in examples, in which the liquid crystal polyester resin composition of the present invention is described, is preferably in a range of 0.01 to 0.05 mm and more preferably in a range of 0.01 to 0.04 mm.

According to even still another aspect of the present invention, the ratio [warpage amount after reflow treatment (mm)]/[warpage amount before reflow treatment mm)] of the warpage amount after the first reflow treatment to the warpage amount before the first reflow treatment measured according to the method described in examples, in which the liquid crystal polyester resin composition of the present invention is described, is preferably in a range of 1.00 to 2.80 mm, more preferably in a range of 1.20 to 2.50 mm, and still more preferably in a range of 1.40 to 2.00 mm.

According to still another aspect of the present invention, the warpage amount after the second reflow treatment measured according to the method described in examples, in which the liquid crystal polyester resin composition of the present invention is described, is preferably in a range of 0.10 to 0.24 mm, more preferably in a range of 0.10 to 0.22 mm, and still more preferably in a range of 0.10 to 0.20 mm.

According to even still another aspect of the present invention, the warpage amount during the second reflow treatment measured according to the method described in examples, in which the liquid crystal polyester resin composition of the present invention is described, is preferably in a range of 0.01 to 0.06 mm, more preferably in a range of 0.02 to 0.05 mm, and still more preferably in a range of 0.02 to 0.04 mm.

According to even still another aspect of the present invention, the ratio [warpage amount after reflow treatment (mm)]/[warpage amount before reflow treatment (mm)] of the warpage amount after the second reflow treatment to the warpage amount before the second reflow treatment measured according to the method described in examples, in which the liquid crystal polyester resin composition of the present invention is described, is preferably in a range of 0.75 to 1.70 mm, more preferably in a range of 0.90 to 1.40 mm, and still more preferably in a range of 1.00 to 1.20 mm.

The preferable ranges of the physical property values of the molded product obtained by using the liquid crystal polyester resin composition of the present invention can be optionally combined.

[Method of Producing Liquid Crystal Polyester Resin Composition]

Examples of the means for blending the raw material components used to obtain the liquid crystal polyester resin composition of the present invention include a method of separately supplying respective raw material components such as the liquid crystal polyester, the mica, and the talc, and fibrous fillers or additives used as necessary to a melt kneader; and a method of preliminarily mixing the raw material components using a mortar, a Henschel mixer, a ball mill, a ribbon blender, or the like and supplying the mixture to a melt kneader.

It is preferable that the liquid crystal polyester resin composition is prepared by melt-kneading the liquid crystal polyester, the talc, the mica, and other components used as necessary using an extruder and extruding the resultant in the pellet form. An extruder which has a cylinder, one or more screws disposed in the cylinder, and one or more supply ports provided in the cylinder is preferably used and an extruder which further has one or more vent portions provided in the cylinder is more preferably used as the extruder.

Examples of products and components serving as molded products of the liquid crystal polyester resin composition include a bobbin such as an optical pickup bobbin or a transformer bobbin; a relay component such as a relay case, a relay base, a relay sprue, or a relay armature; a connector such as RIMM, DDR, a CPU socket, S/O, DIMM, a board to board connector, an FPC connector, or a card connector; a reflector such as a lamp reflector or an LED reflector; a holder such as a lamp holder or a heater holder; a diaphragm such as a speaker diaphragm; a separation claw such as a separation claw for a copying machine or a separation claw for a printer; a camera module component; a switch component; a motor component; a sensor component; a hard disk drive component; a dish such as ovenware; a vehicle component; an aircraft component; and a sealing member such as a sealing member for a semiconductor element or a sealing member for a coil.

As a method of molding the liquid crystal polyester resin composition, a melt molding method is preferable, and examples of the melt molding method include an injection molding method, an extrusion molding method such as a T-die method or an inflation method, a compression molding method, a blow molding method, a vacuum molding method, and press molding. Among these, the injection molding method is preferable.

EXAMPLES

Hereinafter, the effects of the present invention will be described in detail based on the examples. The analysis of the liquid crystal polyester and the evaluation of the characteristics thereof were performed using the following methods.

<Method of Measuring Flow Beginning Temperature of Liquid Crystal Polyester>

The temperature showing a viscosity of 4800 Pa·s (48000 poise) was measured by filling a cylinder, to which a die provided with a nozzle having an inner diameter of 1 mm and a length of 10 mm was attached, with 2 g of liquid crystal polyester using a "FLOW TESTER CFT-500EX" (manufactured by Shimadzu Corporation), raising the temperature at a rate of 4° C./min under a load of 9.8 MPa, melting the liquid crystal polyester, and extruding the liquid crystal polyester from the nozzle.

<(A) Liquid Crystal Polyester>

LCP-1 produced in the following production example was used as the (A) liquid crystal polyester.

Production Example

Production of (A) Liquid Crystal Polyester (LCP-1)

994.5 g (7.2 mol) of 4-hydroxybenzoic acid, 272.1 g (1.64 mol) of terephthalic acid, 126.6 g (0.76 mol) of isophthalic acid, 446.9 g (2.4 mol) of 4,4'-dihydroxybiphenyl, and 1347.6 g (13.2 mol) of acetic anhydride were added to a reactor provided with a stirrer, a torque meter, a nitrogen gas introduction pipe, a thermometer, and a reflux condenser, 0.2 g of 1-methyl imidazole was added thereto as a catalyst, and the inside of the reactor was sufficiently substituted with nitrogen gas.

Thereafter, the temperature of the mixture was increased from room temperature to 150° C. for 30 minutes while the mixture was stirred in a nitrogen gas flow, the same temperature was held, and the mixture was refluxed for 30 minutes.

Next, 2.4 g of 1-methyl imidazole was added thereto, the temperature of the mixture was increased from 150° C. to 320° C. for 2 hours and 50 minutes while by-product acetic acid and unreacted acetic anhydride were distilled off, the temperature thereof was held to 320° for 30 minutes, and the contents were taken out and cooled to room temperature.

Solid phase polymerization was performed by grinding the obtained solid material to have a particle diameter of 0.1 to 1 mm using a grinder, increasing the temperature from room temperature to 250° C. for 1 hour in a nitrogen atmosphere, further increasing the temperature from 250° C. to 295° C. for 5 hours, and holding 295° C. for 3 hours. After the solid phase polymerization, the resultant was cooled, thereby obtaining powdery liquid crystal polyester (LCP-1). The flow beginning temperature of the obtained liquid crystal polyester was 312° C.

<(B) Talc>

The following materials were used as the (B) talc.

(B-1) "GH7" (manufactured by Hayashi Kasei Co, Ltd.) (volume-average particle diameter: 6.5 μm, residues on sieve having meshes with diameter of 45 μm: 0% (all passed through the sieve), Ig. Loss: 4.7%)

(B-2) "MG115" (manufactured by Fuji Talc Industrial Co., Ltd.) (volume average particle diameter: 13 μm, residues on sieve having meshes with diameter of 45 μm: 0.69%, Ig. Loss: 5.9%)

(B-3) "MS-KY" (manufactured by. Nippon Talc Co., Ltd.) (volume-average particle diameter: 23 μm, residues on sieve having meshes with diameter of 45 μm: 1.0%. Ig. Loss: 6.2%)

<(C) Mica>

The following materials were used as the (C) mica.

(C-1) "AB-25S" (manufactured by Yamaguchi Mica Co., Ltd.) (volume-average particle diameter: 24 μm)

(C-2) "A-41S" (manufactured by Yamaguchi Mica Co., Ltd.) (volume-average particle diameter: 41 μm)

<(D) Glass Fiber>

The following materials were used as the (D) glass fibers.

(D-1) "EFH75-01" (manufactured by Central Glass co. Ltd.) (number-average fiber diameter: 10.5 μm)

(D-2) "CS03JAPX1" (manufactured by Owens Corning Corporation) (number-average fiber diameter: 10 μm)

<Additive>

As the release agent, "LOXIOL VPG861" (manufactured by Emery Oleochemicals Japan, Ltd.) was used. The "LOXIOL VPG861" is listed as "(E-1)" in Table 1. As the colorant, "CARBON BLACK CB #45" (manufactured by Mitsubishi Chemical Corporation) was used.

The "CARBON BLACK CB #45" is listed as "(F-1)" in Table 1.

The methods of evaluating respective characteristics are as follows.

<Volume-Average Particle Diameter>

The volume-average particle diameter of the talc and mica was measured using a laser diffraction method under the following conditions. The volume-average particle diameter of the talc and mica were measured in a state of dispersing the talc and mica in water under the following measurement conditions using a scattering type particle size distribution measuring device "LA-950V2" (manufactured by HORIBA, Ltd.) as a measurement device.

[Measurement Conditions]

Measuring device: laser diffraction and scattering type particle size distribution measuring device (LA-950V2, manufactured by HORIBA, Ltd.)

Particle refractive index: 1.57-0.1i (talc)
Particle refractive index: 1.59-0.1i (mica)
Dispersion medium: water
Dispersion medium refractive index: 1.33

<Glass Fiber Length>

Prior to use of the method of measuring the number-average fiber length of glass fibers, 5 g of pellets formed of the composition containing glass fibers were heated in a muffle furnace ("FP410", manufactured by Yamato Scientific Co., Ltd.) at 600° C. for 4 hours in an air atmosphere so that the resin was removed. The number-average fiber length was calculated by dispersing the obtained ash residues containing the glass fibers in an ethylene glycol solution, applying ultrasonic waves to the solution for 3 minutes, dropping several drops of the dispersion liquid on slide glass, loosening the dispersion liquid such that the fibrous filler did not overlap on the slide glass, placing cover glass thereon, adjusting the magnification of a video microscope ("VHX1000", manufactured by Keyence Corporation) to focus on the outline of the glass fibers at a magnification of 100 times, and measuring the lengths of 500 glass fibers.

Examples 1 to 8 and Comparative Examples 1 to 8

Pellets of the liquid crystal polyester composition were obtained by dry-blending the (A) liquid crystal polyester, the (B) talc, the (C) mica, and other components as necessary at mass ratios listed in Table 1, performing melt-kneading under a condition of a screw rotation number of 150 rpm while performing degassing in a twin screw extruder ("PCM-30", manufactured by Ikegai Corp.) equipped with a vacuum vent using a water seal type vacuum pump ("SW-25", manufactured by Shinko Seiki Co., Ltd.), discharging the resultant through a circular nozzle (discharge port) with a diameter of 3 mm in the form of a strand, allowing the resultant to pass through a water bath at a water temperature of 30° C. for 1.5 seconds, adjusting the take-up speed of a rotary blade to 60 m/min through a take-up roller at a take-up speed of 40 m/min, and pelletizing the resultant using a strand cutter (manufactured by Tanabe Plastics Machinery Co., Ltd.).

The obtained pellets were dried by blowing hot air at 130° C. for 4 hours, and the evaluation was performed according to the following method.

The results are listed in Table 1.

<Load Deflection Temperature>

A test piece with a size of 12.7 mm×6.4 mm×6.4 mmt was injection-molded using an injection molding machine ("PNX40-5A", manufactured b Nissei Plastic Industrial Co., Ltd.). As the molding conditions, the cylinder temperature was set to 350° C., the mold temperature was set to 130° C., and the injection speed was set to 75 mm/sec. The load deflection temperature of the obtained test piece was measured under a load of 1.82 MPa in conformity with ASTM D648.

<Solder Resistance Test>

A JIS K7161 (1.2) dumbbell test piece with a size of 1.2 mmt was injection-molded using an injection molding machine ("PNX40-5A", manufactured by Nissei Plastic Industrial Co., Ltd.). As the molding conditions, the cylinder temperature was set to 350° C., the mold temperature was set to 130° C., and the injection speed was set to 90 mm/sec. The obtained test piece was placed in a heat circulation oven ("DN63H", manufactured by Yamato Scientific Co., Ltd.) for 3 minutes, and the temperature at which blisters did not occur in the test piece was measured. Specifically, ten test pieces were placed in an oven at a constant temperature, the test pieces were taken out after the state was held for 3 minutes, and the maximum temperature at which blisters did not occur in any of the test pieces was set as the solder resistance temperature.

<Evaluation of Thin Wall Fiuidity>

The thin wall fluidity was evaluated at each thickness using a mold whose product thickness was able to be changed. The shape and the dimension of the used mold are shown in FIG. 1. The molding was performed by changing the thickness indicated by X in FIG. 1 to 0.12 mmt, 0.20 mmt, and 0.30 mmt. The thickness of the extruded molded product was measured and set as the thin wall fluidity. In addition, the unit of the dimension shown in FIG. 1 is mm.

The injection molding was performed under the following molding conditions using "ROBOSHOT S2000i30B" (manufactured by Fanuc Corporation) as an injection molding machine. The thickness of the obtained molded product was visually read, and the distance of flow was set as the flow length. The results are listed as the "thin wall flow length" in Table 1.

[Injection Molding Conditions]

Cylinder temperature: (nozzle side) 350° C.-350° C.-330° C.-310° C.-280° C.-80° C. (hopper side)
Mold temperature: 120° C.
Measured value: 20 mm
Injection speed: 200 mm/sec
VP switching: pressure switching at 100 MPa and 150 MPa
Pressure keeping: 20 MPa Here, the pressure switching at 100 MPa and 150 MPa indicates an injection molding method of switching the injection speed to injection pressure control at the time at which the injection pressure reached 100 MPa or 150 MPa.

<Measurement of Thin Wall Strength>

A test piece with a thickness of 0.3 mm which was prepared in the measurement of the fluidity was cut into a size of 5 mm×35 mm, and a thin wall strength test using three-point bending was performed under conditions of a test speed of 10 mm/see, a distance of 5 mm between fulcrums, and an indenter width of 1 mm using a precision load measuring device "MODEL-1605HVL" (manufactured by Aikoh Engineering Co., Ltd).

<Method of Measuring Warpage Before Reflow Treatment, During Reflow Treatment, and Before and After Reflow Treatment>

Figure 2:
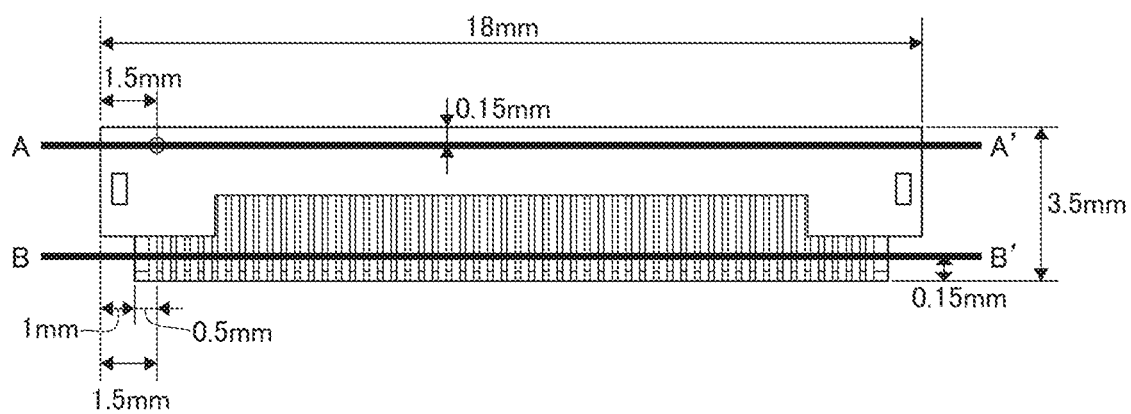
FIG. 2 is a schematic view showing a molded product used for a method of measuring warpage during, before, and after a reflow treatment used in examples.

The molding was performed using "ROBOSHOT S2000i30B" (manufactured by Fanuc Corporation) as an injection molding machine to obtain a connector with the dimensions shown in FIG. 2. As the molding condition, the cylinder temperature was set 350° C., the mold temperature was set to 70° C., and the injection speed was set to 150 mm/sec.

The connector is a 53 pin (0.3 mm pitch) connector for an FPC with a length of 18 mm, a width of 3.5 mm, and a height of 1.0 mm, and the size of the minimum thin-walled portion is 0.1 mm.

<<Method of Measuring Warpage Before Reflow Treatment>>

The warpage amount of the obtained connector was measured using a flatness measurement module "Core 9030C" (manufactured by Cores Corporation). The connector was placed on a flat surface of glass at room temperature, 31 points of positions inside the short direction by a distance of 0.15 mm at intervals of 0.02 mm were measured using a position inside the long direction by a distance of 1.5 mm as a starting point, and the height from the flat surface of the glass was acquired (the line A-A' connecting both ends in the long direction show FIG. 2). Similarly, 31 points of positions inside the short direction by a distance of 0.15 mm at intervals of 0.02 mm were measured using a position inside the long direction by a distance of 0.5 mm as a starting point, and the height from the flat surface of the glass was acquired (the line B-B' connecting both ends in the long direction shown in FIG. 2). Thereafter, the least squares plane of the connector was calculated using the least squares method. The distance from the least squares plane at the time of translation of the height of the least squares plane so as to include the lowest point from among all 62 heights to the highest point from among the 62 heights was calculated as the warpage amount. Further, the calculation of the warpage amount was performed by setting the moving average to an average number 1 and a loop number of 1 and omitting only the measurement point greatly deviated without end point correction.

<Method of Measuring Warpage During Reflow Treatment>

The warpage amount of the obtained connector was measured according to the same method as the method of measuring the warpage amount before the reflow treatment, by performing the reflow treatment at the following temperature profile using a flatness measurement module "Core 9030C" (manufactured by Cores Corporation) and performing measurement at 270° C., and the measured value was set as the warpage value during the reflow treatment.

Figure 3:
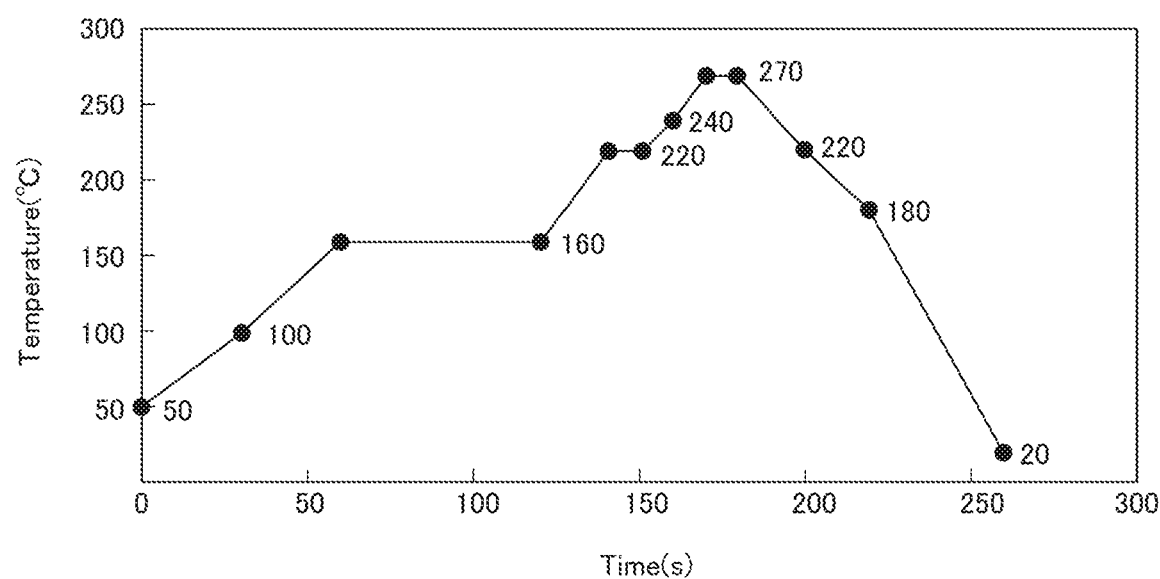
FIG. 3 shows a temperature profile of a reflow simulator used in examples.

Temperature Pattern: (FIG. 3)

STEP 1: The temperature was increased from 50° C. to 100° C. for 30 seconds.

STEP 2: The temperature was increased from 100° C. to 160° C. for 30 seconds.

STEP 3: The temperature was held to 160° C. for 60 seconds.

STEP 4: The temperature was increased from 160° C. to 220° C. for 20 seconds.

STEP 5: The temperature was held to 220° C. for 10 seconds.

STEP 6: The temperature was increased from 220° C. to 240° C. for 10 seconds.

STEP 7: The temperature was increased from 240° C. to 270° C. for 10 seconds.

STEP 8: The measurement was started at the time point at which the temperature reached 270° C.

STEP 9: The temperature was held to 270° C. for 10 seconds.

STEP 10: The temperature was decreased from 270° C. to 220° C. for 20 seconds.

STEP 11: The temperature was decreased from 220° C. to 180° C. for 20 seconds.

STEP 12: The temperature was decreased from 180° C. to 50° C. for 20 seconds.

<<After Reflow Treatment>>

The condition adjustment was performed on the connector, after the reflow treatment was carried out at the temperature profile, at room temperature for 1 hour, the warpage amount was measured according to the same method of measuring the warpage amount before the reflow treatment, and the measured value was set as the warpage amount after the reflow treatment.

In the method described above, the warpage amounts (mm) before the reflow treatment, during the reflow treatment, and after the reflow treatment are listed as "first" in Table 1.

After the first reflow treatment was performed, the second reflow treatment was continuously performed. Specifically, the warpage amount after the first reflow treatment was measured, the connector was cooled at room temperature for 24 hours, and the warpage amount "before the reflow treatment" was measured according to the same method as described above, and the result was set as the "warpage amount before the second reflow treatment".

Next, the reflow treatment was performed under the same temperature raising conditions as described above, and the warpage amount was measured at the time at which the temperature reached 270° C. according to the same method as the method of measuring the warpage amount before the reflow treatment. The result was set as the "warpage amount during the second reflow treatment".

Further, the condition adjustment was performed on the connector, which had been subjected to the reflow treatment, at room temperature for 1 hour, and the warpage amount was measured according to the same method as the method of measuring the warpage amount before the reflow treatment. The result was set as the "warpage amount after the second reflow treatment".

TABLE 1

|  |  | Example 1 | Example 2 | Example 3 | Example 4 | Example 5 | Example 6 | Example 7 | Example 8 | Comparative Example 1 | Comparative Example 2 |
|---|---|---|---|---|---|---|---|---|---|---|---|
| (A) component | LCP-1 | 100 | 100 | 100 | 100 | 100 | 100 | 100 | 100 | 100 | 100 |
| (B) component [volume-average particle diameter] | (B-1) [6.5 μm] | 46 | 15 | 23 | — | — | 15 | 23 | 23 | 54 | — |
|  | (B-2) [13 μm] | — | — | — | 23 | — | — | — | — | — | — |
|  | (B-3) [23 μm] | — | — | — | — | 23 | — | — | — | — | — |

TABLE 1-continued

| (C) component [volume-average particle diameter] | (C-1) [24 μm] | | 8 | 5 | 7 | 7 | 7 | 15 | — | 7 | — | 54 |
|---|---|---|---|---|---|---|---|---|---|---|---|---|
| | (C-2) [41 μm] | | — | — | — | — | — | — | 7 | — | — | — |
| (D) component [number-average fiber diameter] | (D-1) [10.5 μm] | | — | 34 | 37 | 37 | 37 | 37 | 37 | — | — | — |
| | (D-2) [10 μm] | | — | — | — | — | — | — | — | 37 | — | — |
| Additive | (E-1) | | 0.5 | 0.5 | 0.5 | 0.5 | 0.5 | 0.5 | 0.5 | 0.5 | 0.5 | 0.5 |
| | (F-1) | | 1.5 | 1.5 | 1.7 | 1.7 | 1.7 | 1.7 | 1.7 | 1.7 | 1.5 | 1.5 |
| Glass fiber length (μm) | | | — | 141 | 150 | 144 | 146 | 132 | 130 | 349 | — | — |
| Load deflection temperature | 1.82 MPa | °C. | 236 | 246 | 247 | 247 | 247 | 249 | 248 | 271 | 245 | 250 |
| Solder resistance temperature | Foaming temperature | °C. | 270 | 280 | 280 | 270 | 260 | 260 | 260 | 280 | 280 | 240 |
| Connector warpage | | | | | | | | | | | | |
| First | Before reflow | mm | 0.09 | 0.07 | 0.05 | 0.06 | 0.07 | 0.08 | 0.07 | 0.05 | 0.06 | 0.05 |
| | During reflow | mm | 0.05 | 0.05 | 0.03 | 0.04 | 0.04 | 0.03 | 0.04 | 0.05 | 0.06 | 0.05 |
| | After reflow | mm | 0.13 | 0.15 | 0.11 | 0.16 | 0.16 | 0.16 | 0.13 | 0.16 | 0.12 | 0.09 |
| Second | Before reflow | mm | 0.12 | 0.18 | 0.13 | 0.19 | 0.17 | 0.19 | 0.16 | 0.23 | 0.24 | 0.12 |
| | During reflow | mm | 0.04 | 0.03 | 0.04 | 0.03 | 0.04 | 0.04 | 0.04 | 0.06 | 0.07 | 0.05 |
| | After reflow | mm | 0.20 | 0.20 | 0.15 | 0.21 | 0.21 | 0.20 | 0.20 | 0.20 | 0.24 | 0.15 |
| Thin wall physical properties | Thickness | | | | | | | | | | | |
| Bending strength | 0.12 mm | MPa | 104 | 155 | 156 | 143 | 141 | 141 | 144 | 155 | 115 | 141 |
| | 0.2 mm | MPa | 143 | 169 | 165 | 183 | 184 | 184 | 175 | 209 | 139 | 189 |
| | 0.3 mm | MPa | 151 | 183 | 173 | 187 | 198 | 190 | 181 | 205 | 143 | 193 |
| Thin wall flow length | Switching pressure | | | | | | | | | | | |
| 0.12 mm | 100 MPa | mm | 10 | 10 | 9 | 10 | 9 | 10 | 10 | 6 | 11 | 10 |
| 0.2 mm | 100 MPa | mm | 30 | 31 | 27 | 29 | 27 | 28 | 27 | 21 | 28 | 31 |
| | 150 MPa | mm | 38 | 46 | 40 | 46 | 45 | 42 | 42 | 31 | 38 | 40 |
| 0.3 mm | 100 MPa | mm | 67 | 65 | 55 | 58 | 55 | 59 | 58 | 42 | 59 | 66 |
| | 150 MPa | mm | 93 | 96 | 85 | 89 | 85 | 87 | 87 | 68 | 88 | 91 |

| | | | Comparative Example 3 | Comparative Example 4 | Comparative Example 5 | Comparative Example 6 | Comparative Example 7 | Comparative Example 8 |
|---|---|---|---|---|---|---|---|---|
| (A) component | LCP-1 | | 100 | 100 | 100 | 100 | 100 | 100 |
| (B) component [volume-average particle diameter] | (B-1) [6.5 μm] | | 20 | 30 | — | — | — | — |
| | (B-2) [13 μm] | | — | — | 30 | — | — | — |
| | (B-3) [23 μm] | | — | — | — | 30 | — | — |
| (C) component [volume-average particle diameter] | (C-1) [24 μm] | | — | — | — | — | 30 | — |
| | (C-2) [41 μm] | | — | — | — | — | — | 30 |
| (D) component [number-average fiber diameter] | (D-1) [10.5 μm] | | 34 | 37 | 37 | 37 | 37 | 37 |
| | (D-2) [10 μm] | | — | — | — | — | — | — |
| Additive | (E-1) | | 0.5 | 0.5 | 0.5 | 0.5 | 0.5 | — |
| | (F-1) | | 1.5 | 1.7 | 1.7 | 1.7 | 1.7 | 1.7 |
| Glass fiber length (μm) | | | 122 | 133 | 120 | 138 | 119 | 115 |
| Load deflection temperature | 1.82 MPa | °C. | 244 | 251 | 245 | 244 | 253 | 253 |
| Solder resistance temperature | Foaming temperature | °C. | 280 | 270 | 270 | 280 | 240 | 240 |
| Connector warpage | | | | | | | | |
| First | Before reflow | mm | 0.08 | 0.07 | 0.07 | 0.08 | 0.05 | 0.07 |
| | During reflow | mm | 0.08 | 0.06 | 0.06 | 0.08 | 0.06 | 0.05 |
| | After reflow | mm | 0.17 | 0.21 | 0.21 | 0.24 | 0.15 | 0.16 |

TABLE 1-continued

|  |  |  |  |  |  |  |  |  |
|---|---|---|---|---|---|---|---|---|
| Second | Before reflow | mm | 0.19 | 0.26 | 0.26 | 0.27 | 0.17 | 0.18 |
|  | During reflow | mm | 0.07 | 0.06 | 0.07 | 0.08 | 0.07 | 0.07 |
|  | After reflow | mm | 0.24 | 0.25 | 0.25 | 0.29 | 0.18 | 0.19 |
| Thin wall physical properties | Thickness |  |  |  |  |  |  |  |
| Bending strength | 0.12 mm | MPa | 145 | 144 | 132 | 129 | 151 | 152 |
|  | 0.2 mm | MPa | 163 | 173 | 172 | 193 | 200 | 199 |
|  | 0.3 mm | MPa | 175 | 184 | 183 | 195 | 204 | 203 |
| Thin wall flow length | Switching pressure |  |  |  |  |  |  |  |
| 0.12 mm | 100 MPa | mm | 10 | 9 | 10 | 9 | 9 | 10 |
| 0.2 mm | 100 MPa | mm | 32 | 29 | 29 | 28 | 28 | 28 |
|  | 150 MPa | mm | 46 | 45 | 44 | 45 | 42 | 41 |
| 0.3 mm | 100 MPa | mm | 65 | 60 | 59 | 57 | 55 | 54 |
|  | 150 MPa | mm | 97 | 90 | 88 | 86 | 84 | 84 |

As shown in the results, Examples 1 to 8 to which the present invention had been applied showed high fluidity and excellent characteristics such as thin wall strength and solder resistance, and the warpage amounts during the first reflow treatment were all 0.05 mm or less.

Meanwhile, in Comparative Examples 1 to 8 to which the present invention had not been applied, some warpage amounts during the first reflow treatment greatly exceeded 0.05 mm, and the balance between other physical characteristics (fluidity, thin wall strength, and solder resistance) was not able to be achieved.

In addition, in Examples 1 to 8 to which the present invention had been applied, the warpage amounts during the second reflow treatment were approximately 0.05 mm or less. In other words, according to the present invention, it is possible to provide a liquid crystal polyester resin composition which is capable of reducing the warpage amount even in a case where both surfaces are subjected to a soldering treatment and are exposed to a high temperature twice.

What is claimed is:

1. A liquid crystal polyester resin composition comprising:
   (A) liquid crystal polyester;
   (B) talc; and
   (C) mica;
   wherein a total amount ((B)+(C)) of the (B) talc and the (C) mica is in a range of 5 parts by mass to 100 parts by mass with respect to 100 parts by mass of the (A) liquid crystal polyester,
   a mass ratio ((B)/(C)) of a mass of the (B) talc to a mass of the (C) mica is in a range of more than 1/1 and 9/1 or less,
   wherein the liquid crystal polyester consists of a repeating unit derived from 4-hydroxybenzoic acid, a repeating unit derived from terephthalic acid, a repeating unit derived from isophthalic acid, and a repeating unit derived from 4,4'-dihydroxybiphenyl,
   a molar ratio of 4,4'-dihydroxybiphenyl with respect to 4-hydroxybenzoic acid is 0.2 to 1.0, and
   a molar ratio of a total amount of terephthalic acid and isophthalic acid with respect to 4,4'-dihydroxybiphenyl is 0.9 to 1.1.

2. The liquid crystal polyester resin composition according to claim 1, further comprising:
   5 parts by mass to 100 parts by mass of (D) glass fibers with respect to 100 parts by mass of the (A) liquid crystal polyester.

3. The liquid crystal polyester resin composition according to claim 2,
   wherein a number-average fiber length of the (D) glass fibers is in a range of 50 μm to 300 μm.

4. The liquid crystal polyester resin composition according to claim 1,
   wherein a volume-average particle diameter of the (B) talc is in a range of 5 μm to 25 μm.

5. The liquid crystal polyester resin composition according to claim 1,
   wherein a volume-average particle diameter of the (C) mica is in a range of 15 μm to 45 μm.

6. A molded product, which is formed of the liquid crystal polyester resin composition according to claim 1.

7. The liquid crystal polyester resin composition according to claim 1,
   wherein an amount of the (C) mica is 1 part by mass or greater and 20 parts by mass or less with respect to 100 parts by mass of the (A) liquid crystal polyester.

8. The liquid crystal polyester resin composition according to claim 7, further comprising:
   5 parts by mass to 100 parts by mass of (D) glass fibers with respect to 100 parts by mass of the (A) liquid crystal polyester.

9. The liquid crystal polyester resin composition according to claim 7,
   wherein a number-average fiber length of the (D) glass fibers is in a range of 50 μm to 300 μm.

10. The liquid crystal polyester resin composition according to claim 7,
    wherein a volume-average particle diameter of the (B) talc is in a range of 5 μm to 25 μm.

11. The liquid crystal polyester resin composition according to claim 7,
    wherein a volume-average particle diameter of the (C) mica is in a range of 15 μm to 45 μm.

12. A molded product, which is formed of the liquid crystal polyester resin composition according to claim 7.

* * * * *